United States Patent [19]

McCleary

[11] 4,277,008
[45] Jul. 7, 1981

[54] MULTI-PURPOSE RACK AND HITCH FOR ATC

[76] Inventor: Donald J. McCleary, 733 E. McKinney, Neosho, Mo. 64850

[21] Appl. No.: 76,268

[22] Filed: Sep. 17, 1979

[51] Int. Cl.$^3$ .............................................. B60R 9/06
[52] U.S. Cl. ..................................... 224/273; 224/31; 224/32 R; 224/42.43; 280/515; 280/760; 280/769
[58] Field of Search ................... 280/202, 204, 289 A, 280/495, 515, 760, 769; 224/31, 273, 42.43, 42.45 R, 32 R, 42.01

[56] References Cited

U.S. PATENT DOCUMENTS

| 559,761 | 5/1896 | Trancle-Armand | 280/204 |
|---|---|---|---|
| 1,121,580 | 12/1914 | Burkett et al. | 224/31 |
| 1,865,365 | 6/1932 | Foote | 280/760 |
| 2,687,900 | 8/1954 | Thomas | 280/515 |
| 4,077,646 | 3/1978 | Watkins | 280/204 |

FOREIGN PATENT DOCUMENTS 640539  7/1928  France ..................................... 224/31

Primary Examiner—Stephen Marcus
Attorney, Agent, or Firm—Harvey B. Jacobson

[57] ABSTRACT

A pair of opposite side arm assemblies each including upper and lower support arms having front and rear ends are provided. The front ends of the arms includes structure for attaching to upper and lower mounting portions of the rear of an all terrain vehicle and transverse bracing structure extends between and interconnects the arm assemblies adjacent the rear ends of at least one pair of corresponding upper and lower arms. A horizontal and forwardly opening rigid V-shaped tow bar including rearwardly convergent bars joined at their rear ends to define an apex is provided and the forward ends of the bars are rigidly anchored to the rear ends of the aforementioned one pair of support arms. The rear apex of the tow bar includes structure for attachment of a towed vehicle thereto and the upper portions of the opposite side arm assemblies, if desired, may include structure for supporting opposite end portions of an elongated transverse carrier extending between the arm assemblies. Also, the carrier may be dish-shaped and constructed of crossed bars and may include a removable dish-shaped imperforate insert tray.

11 Claims, 8 Drawing Figures

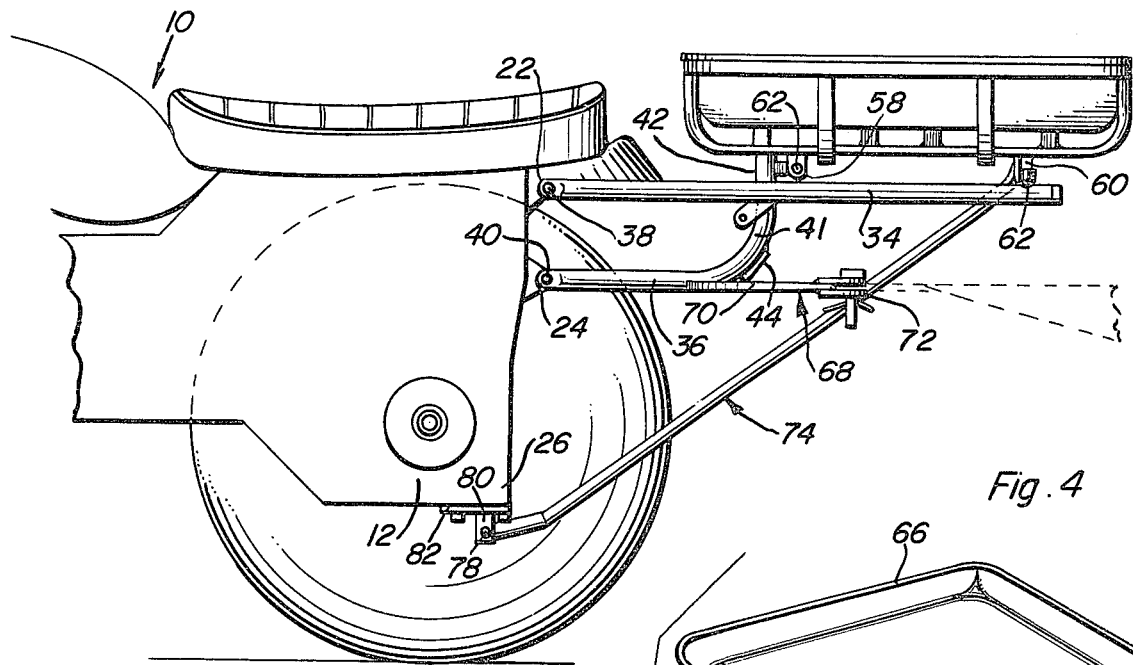
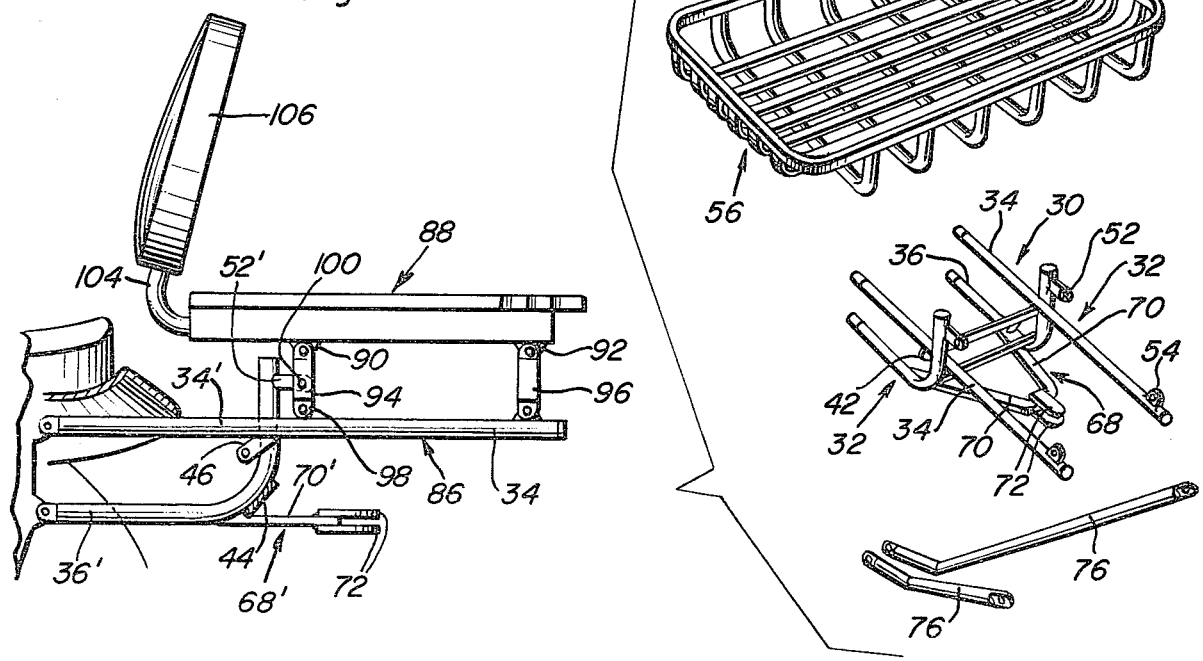

MULTI-PURPOSE RACK AND HITCH FOR ATC

BACKGROUND OF THE INVENTION

All-terrain vehicles are becoming increasingly popular and most are constructed for carrying one or two persons, but little provision has been included to enable an all-terrain vehicle to tow a trailer or other vehicle or to carry bulky loads.

In addition, those vehicles (other than full size passenger vehicles) which may be operated under off-road conditions usually are not provided with adequate supporting structure for attaching conventional towing or load carrying structures thereto.

BRIEF DESCRIPTION OF THE INVENTION

The hitch structure of the instant invention is constructed in a manner whereby it may be readily mounted upon the increasingly popular all-terrain vehicles of the three wheel type. These vehicles are desirable for off-the-road use in various weather conditions inasmuch as they include two opposite side rear driving wheels and a single steerable front wheel and therefore are highly maneuverable and afford considerable traction for off-the-road use.

In view of the lack of two hitches and bulk load carrying structures which may be utilized in conjunction with such vehicles, the main object of this invention is to provide a hitch for all-terrain vehicles of the three wheel type which will enable such vehicles to tow reasonably heavy loads.

Yet another object of this invention is to provide a hitch also including the capacity of supporting bulk loads behind the passager or passagers supported from the vehicle.

Yet another object of this invention is to provide a hitch construction including features thereof adapting it for securement to an associated all-terrain vehicle in a manner such that the loads to be pulled thereby and to be supported therefrom may be evenly distributed throughout the rear of the associated all-terrain vehicle.

A final object of this invention to be specifically enumerated herein is to provide a combined rack and hitch for an all-terrain vehicle and which will conform to conventional forms of manufacture, be of simple construction and easy to install so as to provide a device that will be economically feasible, long lasting and relatively trouble free in installation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a fragmentary side elevational view of the assemblage illustrated in FIGS. 1 and 2 and with the near side rear wheel of the vehicle broken away;

FIG. 4 is an exploded perspective view of the hitch and rack assembly illustrated in FIGS. 1, 2 and 3;

FIG. 5 is a side elevational view of a modified form of combined hitch and rack;

DETAILED DESCRIPTION OF THE INVENTION

Figure 1:
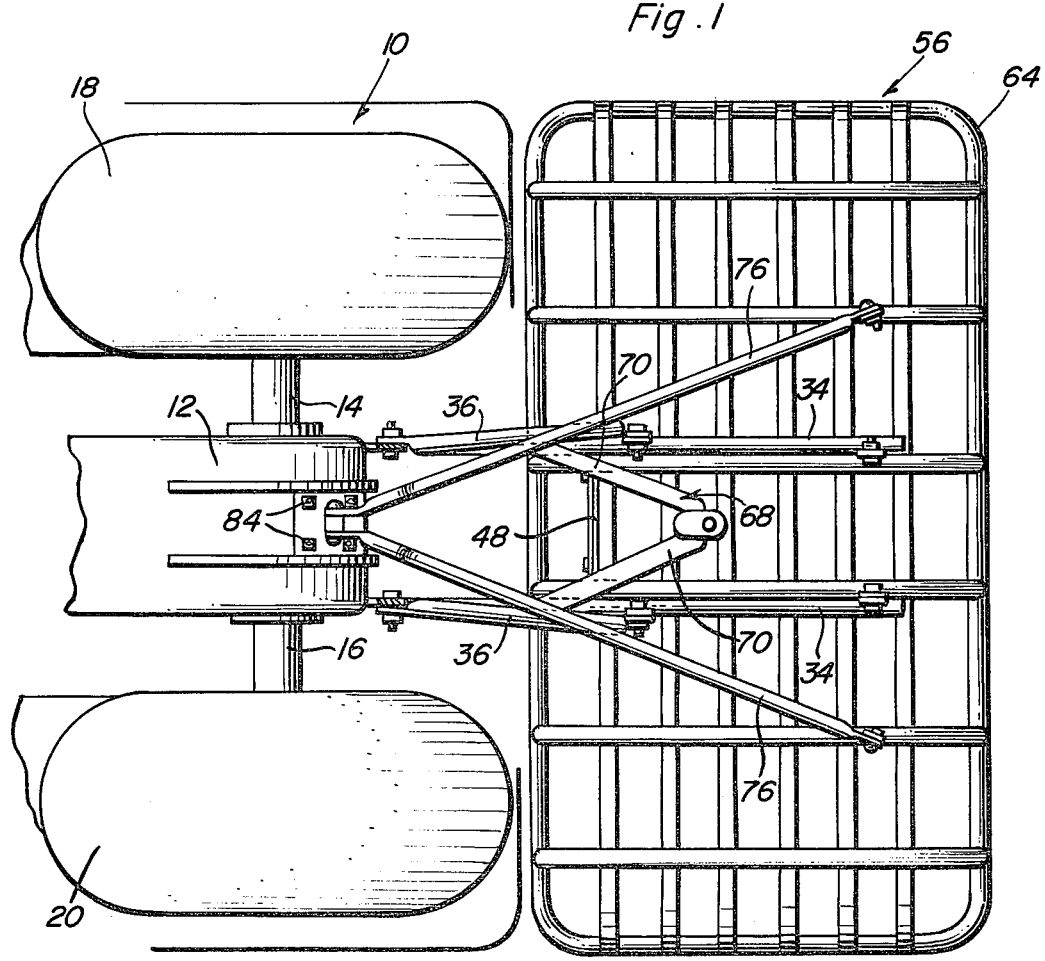
FIG. 1 is a bottom plan view of the rear portion of a conventional form of an all-terrain vehicle and with a combined hitch and bulk load carrier constructed in accordance with the present invention supported from the rear of the all-terrain vehicle.
Figure 2:
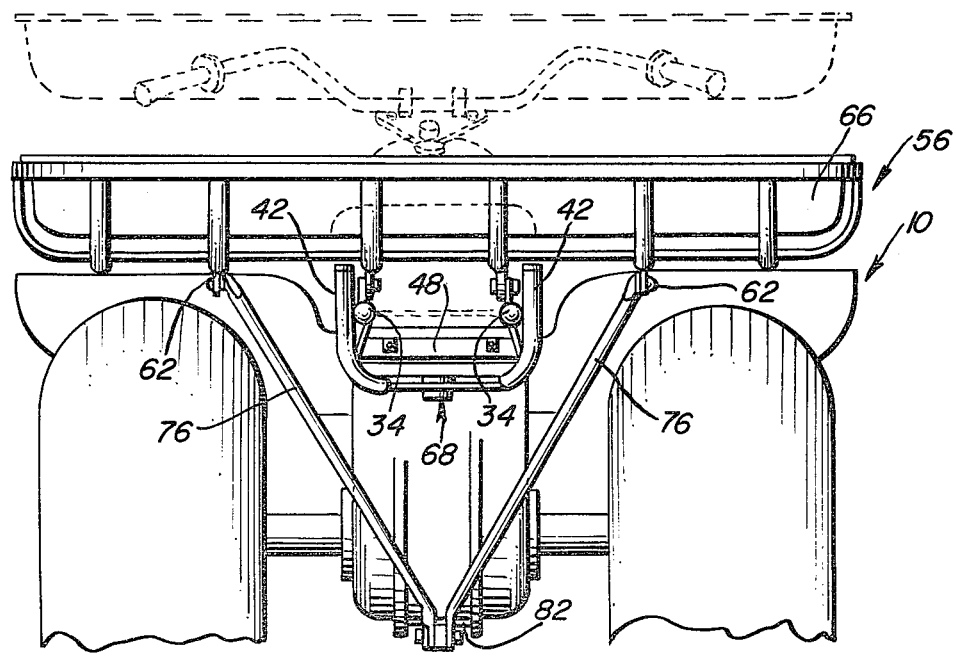
FIG. 2 is a fragmentary rear elevational view of the assemblage illustrated in FIG. 1 and with an exploded position of the insert tray for the load carrier portion thereof illustrated in phantom lines.

Referring now more specifically to FIGS. 1–4 of the drawings, there may be seen a first form of an all-terrain vehicle referred to in general by the reference numeral 10 and including a rear differential assembly 14 from which a pair of opposite side axle assemblies 14 and 16 project, the axle assemblies 14 and 16 having rear driving wheels 18 and 20 journaled therefrom. In addition, the all-terrain vehicle 10 includes a pair of upper opposite side mounting portions 22, a pair of low opposite side mounting portions 24 and a central mounting location 26 on the under side of the differential assembly 12.

The combined rack hitch of the instant invention is referred to in general by the reference numeral 30 and includes a pair of opposite side arm assemblies referred to in general by the reference numeral 32. Each arm assembly 32 includes an upper arm 34 and a lower arm 36. The forward ends of the arms 34 are anchored as at 38 to the mounting portions 22 and the forward ends of the lower arms 36 are anchored at 40 to the mounting portions 24. The rear ends of the arms 36 curve upwardly as at 41 and terminate in vertically short upwardly directed terminal ends 42. The upwardly curving portions 40 of the arms 36 are braced by a horizontal transverse brace 44 extending and secured therebetween and the vertical midportions of the terminal ends 42 pass closely adjacent and have their inner sides secured as by welding to the approximate longitudinal midportions of the arms 34. In addition, the arms 34 include forwardly and downwardly inclined brackets 46 between which a brace 48 (see FIG. 1) is supported for relocating a rear light when mounting the combined rack and hitch 30 on the vehicle 10.

The terminal ends 42 include rearwardly directed mounting lugs 52 and the rear ends of the arms 34 include upwardly directed mounting lugs 54. A shallow upwardly opening rack referred to in general by the reference numeral 56 includes depending front and rear mounting lugs 58 and 60 and suitable fasteners 62 are utilized to secure the lugs 58 and 60 to the lugs 52 and 54 for support of the rack 56 from the rack and hitch 30. The rack 56 is constructed of crossed and interconnected round tubing and flat metal sections extending longitudinally and transversely of the rack 56 and which are generally U-shaped in configuration. An upper peripheral tubing member 64 extends about the upper portion of the rack 56 and interconnects the upwardly projecting ends of the crossed U-shaped transverse and longitudinal tubing sections.

A shallow tray 66 is provided and is removably downwardly receivable within the rack 56. Also, it may be seen from FIGS. 1, 3 and 4 of the drawings that the combined rack and hitch 30 includes a horizontal forwardly opening rigid V-shaped tow bar referred to in general by the reference numeral 68 and that the tow bar 68 includes rearwardly convergent bars 70 joined together at their rear ends and including vertically spaced apertured lugs 72 defining a tow hitch. The forward ends of the bars 70 are secured, as by welding, to the arms 36. Also, a rearwardly and upwardly inclined brace structure referred to in general by the reference numeral 74 is provided. The brace structure 74 includes a pair of forwardly and downwardly convergent arms 76 secured by fasteners 78 to mounting lugs 80 carried by a mounting plate 82 secured to the differential assembly 12 at the mounting location 26 by fasteners 84. The upper ends of the arms 76 are secured to the mounting lugs 54 by the corresponding fasteners 62.

With attention now invited now more specifically to FIG. 5 of the drawings, there will be seen a modified form of combined rack and hitch referred to in general by the reference numeral 86. The combined rack and hitch 86 is in many ways identical to the combined rack and hitch 30 and, accordingly, has its various components designated by prime reference numerals corresponding to the reference numerals indicating the similar components of the combined rack and hitch 30.

The combined rack and hitch 86 differs from the rack and hitch 30 in that it does not include inclined bracing structure corresponding to the bracing structure 74. Further, the combined rack and hitch 86 is not provided with a rack such as the rack 56, but instead is provided with a horizontal rack referred to in general by the reference numeral 88 including depending mounting lugs 90 and 92 from which the upper ends of front and rear pairs of support links 94 and 96 are secured. The lower ends of the links 96 are anchored relative to mounting lugs corresponding to the mounting lugs 54 and the lower ends of the links 94 are anchored relative to mounting lugs 98 carried by the arms 34', intermediate portions of the links 94 being secured as at 100 to the mounting lugs 52'. The rack 88 includes forwardly projecting and upwardly curving opposite side support members 104 from whose upper portions a transverse and upwardly and rearwardly inclined backrest 106 is supported. Otherwise, the combined rack and hitch 86 is substantially identical to the combined rack and hitch 30.

Figure 6:
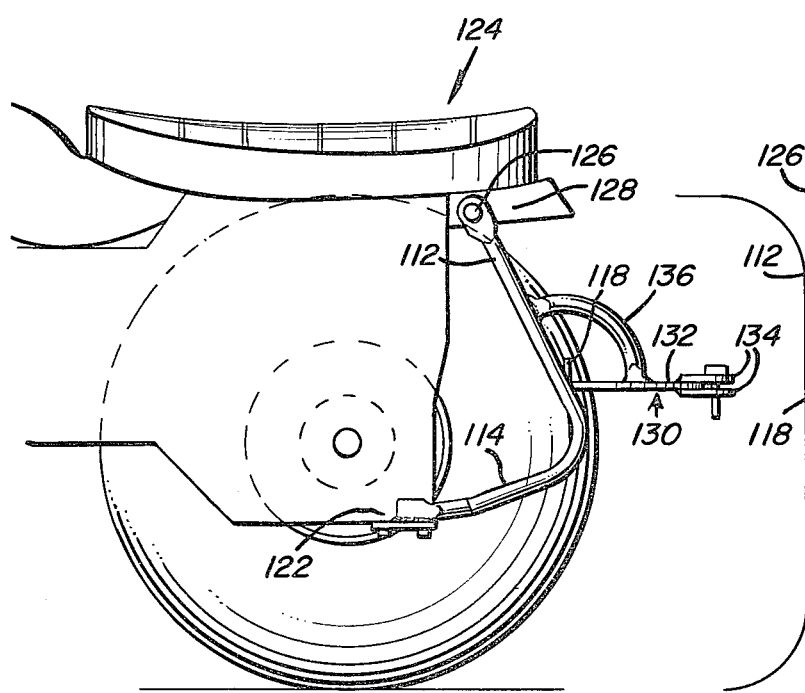
FIG. 6 is a fragmentary side elevational view similar to FIG. 6 but illustrating a modified form of an all-terrain vehicle and with a further modified form of hitch supported therefrom.
Figure 7:
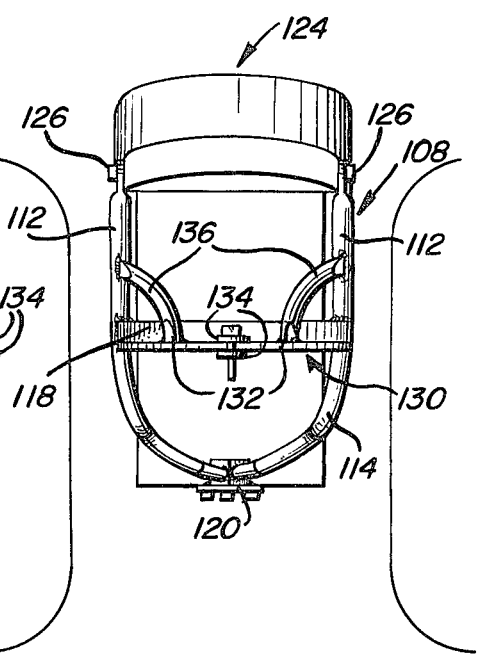
FIG. 7 is a fragmentary rear elevational view of the assemblage illustrated in FIG. 6.
Figure 8:
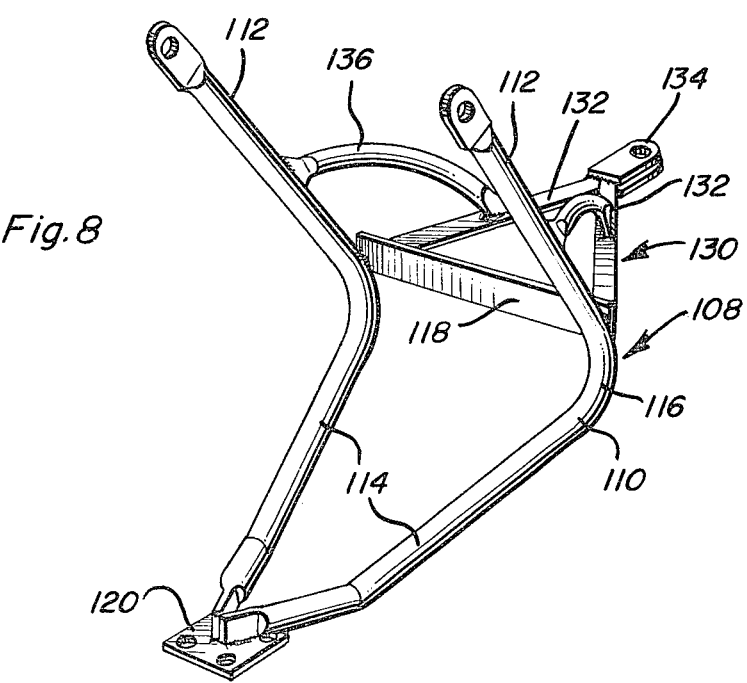
FIG. 8 is a perspective view of the hitch illustrated in FIGS. 6 and 7.

With attention is now invited more specifically to FIGS. 6, 7 and 8 of the drawings, there may be seen yet another modified form of hitch referred to in general by the reference numeral 108. The hitch 108 includes opposite side arm assemblies 110 including upper and lower arms 112 and 114. Corresponding upper and lower side arms 112 and 114 are rearwardly convergent with the upper arms being rearwardly and downwardly inclined and the lower arms being rearwardly and upwardly inclined. The rear ends of corresponding arms 112 and 114 are joined by an integral curve portion 116 and a transverse brace 118 corresponding to the transverse brace 44 which extends between and is secured to the lower ends of the arms 112.

The lower ends of the arms 114 converge together and are secured to a mounting plate 120 corresponding to the mounting plate 82, and the mounting plate 82 is secured to a mounting location 122 of a modified form of an all-terrain vehicle referred to in general by the reference numeral 124. The upper ends of the arms 112 are secured as at 126 to upper opposite side mounting portions 128 of the all-terrain vehicle 124 and a tow bar referred to in general by the reference numeral 130 is provided. The tow bar 130 is similar to the tow bar 68 in that it includes rearwardly convergent bars 132 joined together at their rear ends and secured, in any convenient manner such as by welding, to the lower ends of the arms 112 immediately below the transverse brace 118. The rear end of the tow bar 130 includes vertically spaced apertured lugs 134 corresponding to the mounting lug 70 and defining a tow hitch. Also, the hitch 108 includes a pair of opposite side rearwardly projecting and downwardly curving bracing bars 136 whose upper forward ends are secured to the rear surface portions of the vertical midportions of the arms 112 and whose rear lower ends are secured to longitudinal midportions of the bars 132.

Inasmuch as the hitches 30, 86 and 108 enjoy multiple upper and lower and opposite side attachment points to the corresponding all-terrain vehicles and the opposite side arm assemblies thereof are adequately transversely braced relative to each other and the tow hitches thereof themselves comprise transverse braces as well as hitch members which evenly distribute the pulling forces exerted on the tow bars to opposite side portions of the hitches, the hitches 30, 86 and 108 are believed to be clearly superior hitch constructions. Also, on the hitches 82 and 108 the tow bars 68 and 130 are spaced between the uppermost and lowermost points of attachment of the hitches to the corresponding all-terrain vehicles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an all-terrain vehicle including lower and upper opposite side mounting portions, a tow hitch for said vehicle, said tow hitch including opposite side arm assemblies each having upper and lower support arms having front and rear ends, means attaching the front ends of said lower arms to said lower mounting portion and the front ends of said upper arms to said upper opposite side mounting portions, transverse bracing means extending between and connecting said arm assemblies adjacent the rear ends of at least one pair of corresponding upper and lower arms, a horizontally forwardly opening rigid V-shaped tow member including rearwardly convergent bars joined at their rear ends to define an apex, the forward ends of said bars being rigidly anchored to the rear ends of said one pair of arms, and said apex including means for attachment of a towed vehicle thereto.

2. The combination of claim 1 wherein the rear ends of said lower arms curve upwardly and are rigidly joined to portions of the corresponding upper arms spaced rearwardly of the front ends thereof.

3. The combination of claim 2 wherein the rear ends of said lower arms terminate in upwardly directed terminal ends, said rear ends of said lower arms projecting rearwardly of the terminal ends of said upper arms, and a horizontal rack including front and rear portions, said rack being disposed over the rear end portions of said upper arms, and means anchoring the front and rear portions of said rack to said terminal ends and the rear ends of said upper arms, respectively.

4. The combination of claim 3 wherein the forward portion of said rack includes a rearwardly and upwardly inclined backrest, said vehicle including a passenger seat disposed forwardly of said backrest.

5. The combination of claim 3 wherein said rack defines an upwardly opening tray and is constructed of crossed tubular members.

6. The combination of claim 5 including an upwardly opening tray insert removably downwardly receivable in said rack, said tray insert being at least substantially imperforate.

7. The combination of claim 2 wherein said vehicle includes a center lowermost mounting location, a pair of rearwardly and upwardly inclined bracing bars, rigidly anchored relative to said mounting location, means anchoring the upper ends of said bracing bars to the rear ends of said upper arms.

8. The combination of claim 1 wherein the upper and lower arms of each arm assembly is rearwardly convergent, said lower arms being rearwardly and upwardly inclined, said upper arms being rearwardly and downwardly inclined, the rear ends of corresponding upper and lower arms being joined by integral curved portions.

9. The combination of claim 8 wherein said transverse bracing means extends between the lower end portions of said upper arms.

10. The combination of claim 9 wherein the forward ends of said lower arms are convergent, means rigidly joining the forward ends of said lower arms and rigidly anchoring said forward ends of said lower arms to a central lower mounting portion of said vehicle.

11. The combination of claim 10 wherein said tow hitch includes opposite side arcuate bracing bars, each of said bracing bars including horizontal forward ends and downwardly directed rear ends, said downwardly directed rear ends of said arcuate bracing bars being anchored relative to longitudinal midportions of the corresponding bars of said tow member, the forward ends of said bracing bars being anchored relative to lonitudinal midportions of said upper arms.

* * * * *